(12) United States Patent
Mackey et al.

(10) Patent No.: US 8,218,574 B2
(45) Date of Patent: Jul. 10, 2012

(54) SCALABLE PACKET ANALYZER AND RELATED METHOD

(75) Inventors: Christopher D. Mackey, Spencerport, NY (US); Duncan G. Harris, Webster, NY (US); Michael T. Kurdziel, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 379 days.

(21) Appl. No.: 12/115,567

(22) Filed: May 6, 2008

(65) Prior Publication Data

US 2009/0279438 A1 Nov. 12, 2009

(51) Int. Cl.
*H04J 3/24* (2006.01)
(52) U.S. Cl. .......................... 370/474; 370/392; 380/255
(58) Field of Classification Search .................. 370/392, 370/474; 380/255
See application file for complete search history.

(56) References Cited

U.S. PATENT DOCUMENTS

| | | | |
|---|---|---|---|
| 6,324,288 B1 * | 11/2001 | Hoffman | 380/249 |
| 6,499,107 B1 | 12/2002 | Gleichauf et al. | 713/201 |
| 6,629,099 B2 | 9/2003 | Cheng | 707/10 |
| 6,795,918 B1 | 9/2004 | Trolan | 713/160 |
| 6,957,272 B2 * | 10/2005 | Tallegas et al. | 709/238 |
| 6,959,090 B1 * | 10/2005 | Alve et al. | 380/277 |
| 7,069,495 B2 | 6/2006 | Soderberg et al. | 714/776 |
| 7,085,236 B2 | 8/2006 | Oldak et al. | 370/235.1 |
| 7,310,728 B2 * | 12/2007 | Haight | 713/154 |
| 7,316,031 B2 | 1/2008 | Griffith et al. | 726/22 |
| 2005/0108382 A1 * | 5/2005 | Murotake et al. | 709/223 |
| 2005/0125657 A1 * | 6/2005 | Haight | 713/160 |
| 2005/0232303 A1 * | 10/2005 | Deforche et al. | 370/469 |
| 2006/0028992 A1 * | 2/2006 | Kangru | 370/241 |
| 2006/0059154 A1 | 3/2006 | Raab | 707/9 |
| 2006/0221967 A1 * | 10/2006 | Narayan et al. | 370/392 |
| 2007/0002857 A1 | 1/2007 | Maher | 370/389 |
| 2007/0223689 A1 * | 9/2007 | O'Brien et al. | 380/30 |
| 2008/0040805 A1 * | 2/2008 | Yasue | 726/26 |
| 2010/0077141 A1 * | 3/2010 | Achler | 711/108 |

* cited by examiner

*Primary Examiner* — Jason Mattis
(74) *Attorney, Agent, or Firm* — Allen, Dyer, Doppelt, Milbrath & Gilchrist, P.A.

(57) ABSTRACT

A scalable packet analyzer receives data packets from a data packet source for packet analysis and includes a plurality of policy engine arrays, each having a plurality of packet analysis microengines. A policy algorithm loader module is operative with each packet analysis microengine for loading a policy algorithm to each packet analysis microengine such that each packet analysis microengine analyzes specific sections of the data packet in parallel within each policy engine array based on the applied policy algorithm to obtain data about the data packet for further data packet processing.

25 Claims, 5 Drawing Sheets

HAIPE NETWORK ARCHITECTURE

SCALABLE PACKET ANALYZER AND RELATED METHOD

FIELD OF THE INVENTION

This application relates to systems and devices for analyzing data packets, and more particularly, this application relates to a scalable packet analyzer capable of high-assurance operation that analyzes specific sections of a data packet.

BACKGROUND OF THE INVENTION

Secure high assurance communications, for example, using the HAIPIS Version 3.1 (High Assurance Internet Protocol Encryption Interoperability Specification) developed by the National Security Agency, are becoming more commonplace. Developers are actively pursuing embodments of new, secure high assurance communications with requirements for real time packet analysis that includes statistics gathering and packet control used for covert channel and bypass communications. Depending on the underlying channel capacities or other aspects of individual applications, different levels of performance may be required demanding enhanced packet analysis.

One challenge is to provide a hardware platform that provides the required level of computational support for a packet analyzer, but is optimized with respect to cost, size, weight and similar factors that developers actively pursue and seek. It is often difficult for developers to scale any packet analyzer to a small size with low power applications and a lower throughput and latency without significant architectural changes in the packet analyzers. The cost changes non-linearly with performance requirements such as for non-recurring engineering (NRE) and recurring engineering (RE) requirements.

Many packet analyzers are software intensive. Performance scaling in some of these systems is achieved by varying the processing and memory resources. Although this type of modification has been found acceptable in some packet analysis applications, any achieved performance scaling makes it difficult to obtain high throughput rates and obtain a low latency. It is also difficult to customize for specific customer requirements because of bypass policies and real-time packet analysis issues, including requirements for statistics gathering and packet manipulations.

SUMMARY OF THE INVENTION

In accordance with a non-limiting example, a packet analyzer receives data packets for packet analysis. The packet analyzer includes a plurality of policy engine arrays, each having a plurality of packet analysis microengines. A policy algorithm loader module is operative with each packet analysis microengine for loading a policy algorithm to each packet analysis microengine such that each packet analysis microengine analyzes specific sections of the data packet in parallel within each policy engine array based on the applied policy algorithm to obtain data about the data packet for further data packet processing.

Each packet analysis microengine is operative for analyzing individual bits or packet data structures based on the policy algorithm applied to each respective packet analysis microengine. A policy database stores different policy algorithms to be applied to respective packet analysis microengines. A policy algorithm loader module is operative for allocating a greater number of packet analysis microengines or policy engine arrays for analyzing data packets in response to higher data throughput requirements.

In another aspect, each packet analysis microengine is operative for manipulating specific sections of each data packet based on the policy algorithm. A policy statistics gathering module is operative with the plurality of policy engine arrays for collecting statistics concerning data packet analysis. A packet check module and a packet cross-check module are operative with each other and the plurality of policy engine arrays for providing redundancy for high assurance operation.

In another aspect, a communications device has first and second processing units and a cryptographic unit receives sensitive data from the first processing unit and encrypts the data to be forwarded to the second processing unit. The packet analyzer is operative with the cryptographic unit and first and second processing units for bypassing at least specific sections of the data packet around the cryptographic unit based on the data obtained by analyzing the packets. The first and second processing units can be formed as respective red and black side subsystems of the communications device.

A method and communications device is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
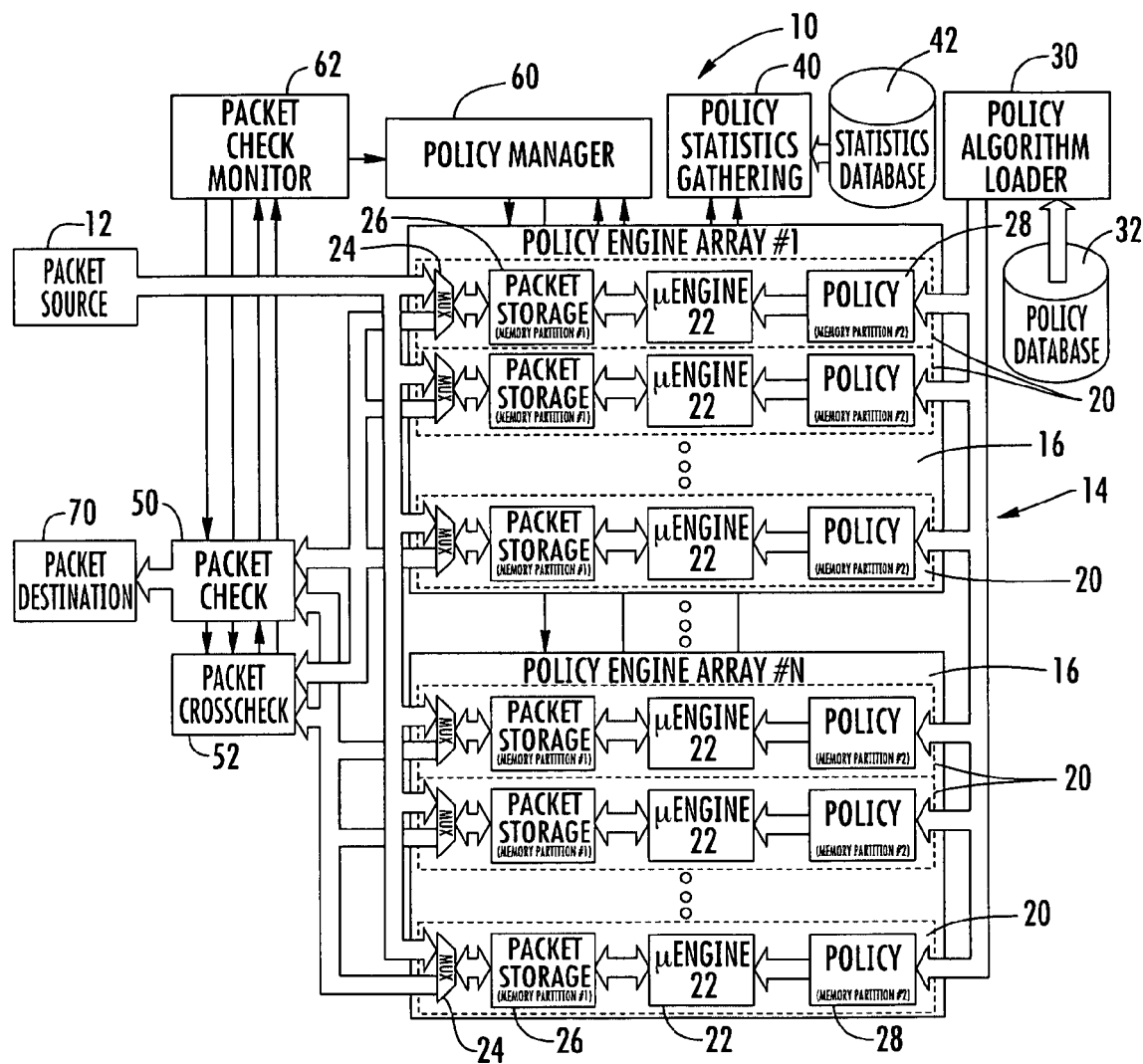
FIG. 1 is a block diagram of a packet analyzer in accordance with a non-limiting example of the present invention.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

It should be appreciated by one skilled in the art that the approach to be described is not limited for use with any particular communication standard (wireless or otherwise) and can be adapted for use with numerous wireless (or wired) communications standards such as Enhanced Data rates for GSM Evolution (EDGE), General Packet Radio Service (GPRS) or Enhanced GPRS (EGPRS), extended data rate Bluetooth, Wideband Code Division Multiple Access (WCDMA), Wireless LAN (WLAN), Ultra Wideband (UWB), coaxial cable, radar, optical, etc. Further, the invention is not limited for use with a specific PHY or radio type but is applicable to other compatible technologies as well.

Throughout this description, the term communications device is defined as any apparatus or mechanism adapted to transmit, receive or transmit and receive data through a medium. The communications device may be adapted to communicate over any suitable medium such as RF, wireless, infrared, optical, wired, microwave, etc. In the case of wireless communications, the communications device may comprise an RF transmitter, RF receiver, RF transceiver or any combination thereof. Wireless communication involves: radio frequency communication; microwave communication, for example long-range line-of-sight via highly directional antennas, or short-range communication; and/or infrared (IR) short-range communication. Applications may involve point-to-point communication, point-to-multipoint communication, broadcasting, cellular networks and other wireless networks.

As will be appreciated by those skilled in the art, a method, data processing system, or computer program product can embody different examples in accordance with a non-limiting example of the present invention. Accordingly, these portions may take the form of an entirely hardware embodiment, an entirely software embodiment, or an embodiment combining software and hardware aspects. Furthermore, portions may be a computer program product on a computer-usable storage medium having computer readable program code on the medium. Any suitable computer readable medium may be utilized including, but not limited to, static and dynamic storage devices, hard disks, optical storage devices, and magnetic storage devices.

The description as presented below can apply with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

In accordance with a non-limiting example, the packet analyzer (also referred to as a packet analysis system) as described in detail later can be formed as a scaleable, parallel hardware architecture for packet analysis applications for enhanced packet processing and adapted for many different applications, including secure high assurance communications networks such as HAIPE communications. The packet analyzer uses parallelism to introduce increased performance in terms of throughput and reduced latency. It can be scaleable to analyze any individual bit and/or packet data structure based on policy and modify any individual bit and/or packet data structure based on policy. It can monitor and gather packet structure statistics, which can be stored or used in real-time to reconfigure or modify.

The packet analyzer incorporates a plurality of policy engine arrays that are tightly coupled to a packet source, which increases the overall system performance versus a traditional software based solution. A policy engine array is reconfigurable to allow dynamic assignment of analysis resources and dynamic power management of the analysis resources. Programmable redundancy enables high assurance requirements and multiple packets can be analyzed in parallel.

The packet analyzer is also scaleable to meet the requirements of different end applications and is upgradeable to meet current and future standard implementations. The overall system is customizable with any bypass policies, real-time packet analysis, statistics gathering, and packet manipulations. An advantage is the ability to perform packet data manipulation on packet data statistics and other unique requirements, which can be used to reconfigure any policy engine.

The scaleable architecture allows quick porting or reuse to various market segments and reduced non-recurring engineering costs for any specific implementation.

FIG. 1 is a block diagram showing basic function modules of the packet analyzer as a system illustrated generally at 10 and showing a data packet source 12, which could be data packets originating from a communications device, a wide or local area network, a communications network such as the internet, or other source of data packets. The packet analyzer 10 has a general module structure shown at 14 and receives data packets from a data packet source 12 for packet analysis and includes a plurality of policy engine arrays 16 formed as an array as illustrated by the policy engine array no. 1 and ending in the policy engine array "N." Each policy engine array 16 includes a plurality of packet analysis microengine modules 20, which each include a packet analysis microengine 22. Each packet analysis microengine module 20 typically receives the packet simultaneously from the data packet source 12. Each module 20 includes a multiplexer 24, packet storage 26 and policy algorithm storage 28. A policy algorithm loader module 30 is operative with each packet analysis microengine module 20 and loads a policy algorithm that is retrieved from a policy database 32 to each policy analysis microengine module 20 through the policy algorithm storage 28 such that each policy analysis microengine 22 analyzes specific sections of the data packet in parallel within each policy engine array 16 based on the applied policy algorithm to obtain data about the data packet for further data packet processing. Each policy algorithm loaded and stored in the policy algorithm storage 28 could be specific to a respective microengine 22.

The policy engine arrays 16 and packet analysis microengine modules 20 could be formed in a Field Programmable Gate Array (FPGA) or Application Specific Integrated Circuit (ASIC) or other programmable technologies. The modules each include a memory partition for packet storage 26 that is operative with a respective packet analysis microengine 22 and the policy algorithm storage 28 as part of the memory partition. The policy algorithm loader module 30 loads a specific policy algorithm for a specific module 20 and microengine 22. As packets are analyzed, a different policy algorithm could be loaded for a new analysis within a specific packet analysis microengine.

The policy algorithm loader module 30 retrieves a specific policy algorithm to be applied to the packet analysis microengine 22 through the policy algorithm memory partition such that the packet analysis microengine 22 to which the policy algorithm is applied will analyze a specific section of the data packet in parallel with other packet analysis microengines as illustrated. The packet analysis microengines 22 can analyze individual bits or packet data structures within each packet analysis microengine based on the policy algorithm that is applied to a respective packet analysis microengine. For example, an Ethernet frame includes a Media Access Control (MAC) header such as a destination MAC address, a source MAC address, an "ether type" field. It also includes the much larger payload data section, followed by the CRC checksum. A specific packet analysis microengine 22 can analyze a specific set of bits such as corresponding to the source MAC address or the "ether type" field. Also, certain selected portions of the payload data section could be analyzed by one or more microengines 22 to look for specific recurring data sections as a non-limiting example.

During packet analysis, statistics about the data packets can be gathered within the policy statistics gathering module 40 and stored within the statistics database 42. Based upon these analysis statistics, each policy engine array 16 and individual microengines 22 can be configured or reconfigured for changing the manner of loading or type of policy algorithm that is loaded to each specific packet analysis microengine for analyzing or manipulating the bits or subsets of data within a data packet in a different manner. It is possible to allocate a greater number of packet analysis microengines 22 or policy engine arrays 16 for analyzing data packets in response to higher data throughput requirements, such as based upon the initial analysis of the data packets. The specific sections of each data packet can also be manipulated differently based upon the applied policy algorithm, which could be changed and configured based upon the statistics as gathered from an initial data packet analysis.

As illustrated, a packet check module 50 and packet cross-check module 52 can be operative with each other and with selected plurality of policy engine arrays 16 and associated microengines 22 and provide redundancy for high assurance operation. For example, one policy engine array will analyze a packet and another will analyze the same packet in a redundant fashion, and the respective packet check and packet cross-check modules 50, 52 will cross-check and check packet analysis results to ensure high assurance operation. A policy manager module 60 manages the type of policy algorithms that could be applied based upon monitored packets within the packet check monitor module 62. The packet cross-check module has been added for the high assurance operation and if high assurance operation is not necessary, then the packet cross-check module 52 does not have to be operated in the high assurance mode and additional policy engine arrays could be added since the packet cross-check module and its functional array is no longer required. From the packet check module 50, packets are output to a packet destination 70 as illustrated.

It should be understood that a data packet is distributed across a plurality of the policy engine arrays 16, and in one aspect, each packet analysis microengine 22 would operate on a specific sub-portion, i.e., specific section of the data packet and parallel within each policy engine array. Bit field analysis and bit field manipulation can be accomplished. The packet analysis system 10 as described is reprogrammable and scaleable through the use of the policy algorithm loader module 30 and policy manager module 60. Also, it is possible to reconfigure or configure on-the-fly the various policy engine arrays 16 and packet analysis microengines 22. Groups of arrays can be placed in parallel or in sequential operation to each other. It is also possible for a packet analysis microengine 22 to look at specific header information or portions of the data payload and break-up a data packet for analysis. It is possible to look at the frequency of different values, the frequency of data packets through the entire packet analysis system and the types of bits that are used. Bypass operation is possible such as noted with the example described below. An example of the policy algorithm is as follows. For example, pseudocode in C++ could be as recited below:

```
Main(Policy_Index_Array,Statistics_Policy_struct)
{
    /* Setup and discover number of Policy Arrays and Number of Engines
and set policy into engine */
        Policy_manager(Initialize,Policy_Index_Array);   /* Initialize
policy manager */
        Policy_manager(Get_Policy_Engine_Array_Size, Policy_Array_Size);
            /*Get the number of policy engines and policy array size*/
        for(n=1, n<Policy_Array_Size,n++)    /* For each element of the
Policy load engines and set mux's to correct state*/
        {
            Policy_manager(Get_Number_of_Engines,Num_Engines)
            for(y=1,y<Num_Engines,y++)
        {
Policy_manager(Get_Policy,Policy_Index_Array,x,y,Policy_pointer);
                Policy_manager(Write_Policy,y,x,Policy_Pointer);
                Policy_manager(Set_Mux_Pattern,y,x)          /*set
individual engine mux
            }
        }
    /* Engines are now setup and loaded.    Note that engines can have
unique or common policies loaded*/
        Policy_manager(Initialize_policy_Stat_Engine);
        Policy_manager(Load_Packet_Check_Monitor);
        Policy_manager(Load_Statistics_Policy,Statistics_Policy_struct);
        Configuration_Set = 1;
/* Since engines are now all configured process data as required*/
        /* Note that all engines run in parallel and are combined into
Policy Engine Arrays as desired
            to model this parallelism the code show below will use the
model of parallel processes.
            Hardware will be used to implement the actual engines but
will be configured by policy files.*/
        for(n=1, n<Policy_Array_Size,n++)    /* Start all parallel processes
*/
        {
            Policy_manager(Start_Policy_Array,n)   /* Start Policy
Engine Array N */
            for(y=1,y<Num_Engines,y++)
            {
Policy_manager(Start_Policy_Engine,Engine_Process,y,n); /* Start
Individual Policy Engine */
            }
        }
}
/***********************************************************
**************************************/
/* Engine Process pseudo code */
Engine_Process()
    while(Configuration_Set)    /* Loop until configuration is modified
*/
    {
        while(Engine_Data == unavailable)
        {
            Idle_process( );
        }
        /* Data is available - so process it */
        Input_Buffer_ptr = Packet_Storage_Update( );
        for(i=1,i<=engine_rules;i++)
```

-continued

```
    {
        Solve_engine_rule(rule_array,i,result_struct);
        Update_Statistics(rule_array,i,result_struct);
        Policy_manager(Update_results,result_struct);
    }
    Check_Configuration_Update(Configuration_Set);
}
/***************************************************************
*****************************************/
/* Policy Manager Packet Process pseudo code */
Policy_Manger_Packet_Process( )
    while(Configuration_Set)   /* Loop until configuration is modified
*/
    {
        while(Policy_manager(Check_Packet_Data) == unavailable)
        {
            Idle_process( );
        }
        /* A data packet is available - so process it */
        Packet_Buffer_ptr = Packet_Storage_Update( );
        for(i=1,i<=Policy_Engine_Array_Configuration;i++)
        {
            Policy_manager(Packet_Check_Monitor,Packet_Buffer_ptr,
Status);
            If(Status == PACKET_CHECK_OK)
                Policy_manager(Write_Packet,
Output_struct,Packet_Buffer_ptr)
            else
Policy_manager(Discard_Packet_Update_Statistics,Packet_Buffer_ptr);
            Policy_manager(Update_results,result_struct);
        }
        Check_Configuration_Update(Configuration_Set);
    }
/***************************************************************
*******************************/
```

Figure 2:
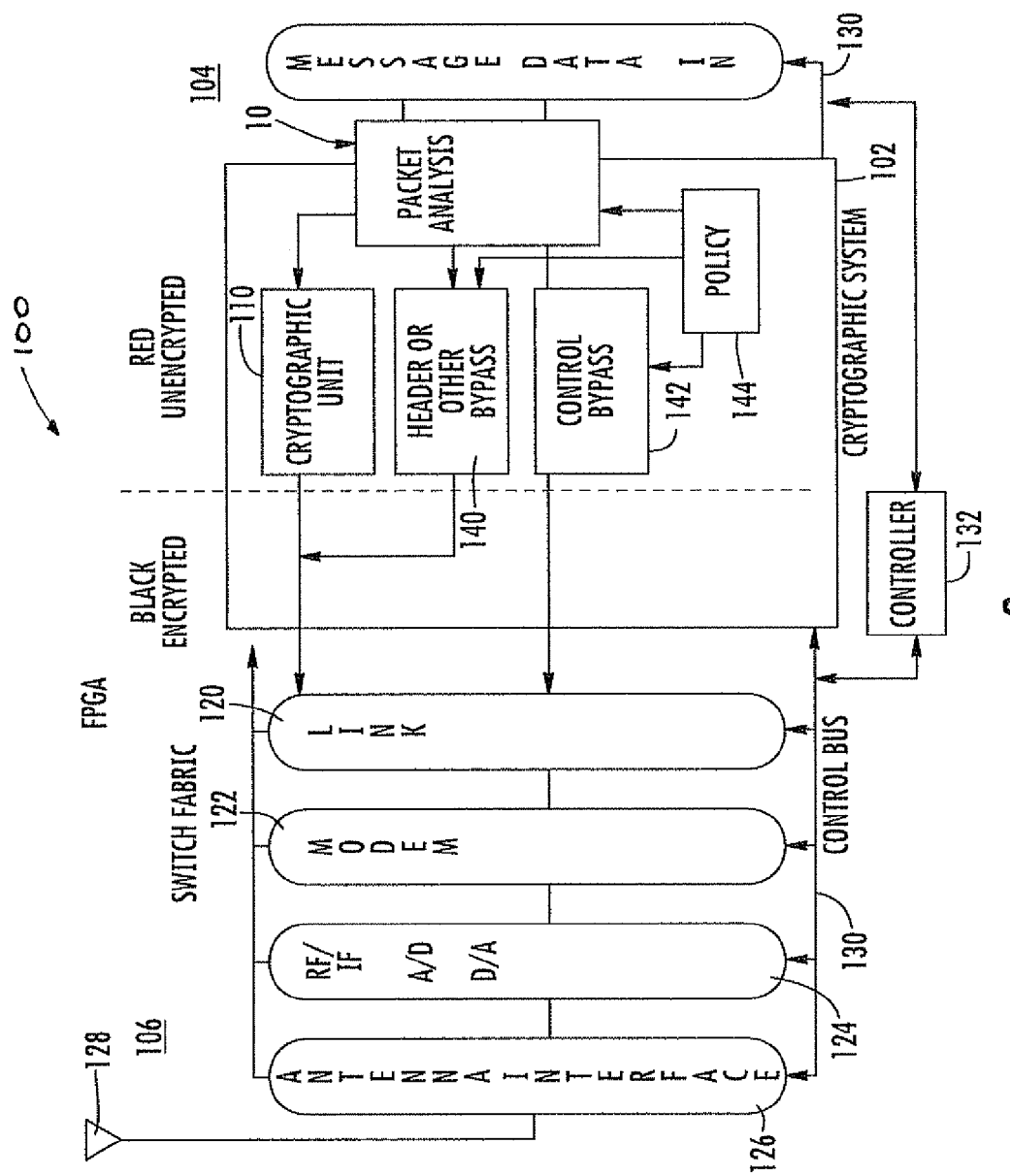
FIG. 2 is a block diagram of a software defined radio (SDR) showing basic components for red and black side processing and a packet analyzer that is applied to the cryptographic system in accordance with a non-limiting example of the present invention.

FIG. 2 is an example of a software defined radio illustrated at 100 in which the packet analyzer 10 is used and operative with the cryptographic system 102, which is operative in the radio 100 as a communications device having first and second processing units 104, 106 corresponding to respective red and black side subsystems of the software defined radio. The cryptographic unit 110 as part of the cryptographic system 102 receives sensitive data from the first processing unit 104 and encrypts the data to be forwarded to the second processing unit 106. The packet analyzer 10 is operative with the cryptographic unit and first and second processing units 104, 106 for secure bypassing at least specific sections of the data packet around the cryptographic unit 110 based on the data obtained from analysis of the data packets or specific requirements per bypass policy algorithm, such as for bypassing the header portion only. The units or modules as described could be implemented in a Field Programmable Gate Array or Application Specific Integrated Circuit and include a switch fabric for the black encrypted subsystem. The system includes a link processing module 120, a modem 122 with adaptive processing capability, the RF/IF section 124 with analog-to-digital and digital-to-analog circuits or module functions and an antenna interface 126 with an antenna 128. The control bus 130 is operative with the various units, circuits or modules as illustrated and includes a controller 132.

The packet analyzer 10 receives packet data from the packet data source as part of the red unencrypted side and analyses the packet data. The analyzer 10 forwards the packet data through the cryptographic unit 110 or based upon certain requirements as identified beforehand or during packet analysis, bypasses some of the data such as the header around the cryptographic unit 110 such as through the bypass module 140. Control messages can be bypassed as illustrated using the control bypass module 142. Policy for the bypass can be stored within a bypass policy database 144, or emanate from the policy database 32 of the packet analyzer 10. Different bypass enforcement mechanisms as guards can be parameterized by different security policies for data packets such as the type, the size, the range of values and the frequency of different components. The control, status and header bypass policies are operative for specific applications. Waveform-specific security policies can also define different parameters of the bypass components. It should be understood that the description relative to FIG. 2 is a general description of how the packet analysis system could be applied to a software defined radio in a non-limiting example.

An example of a radio that could also incorporate the packet analyzer 10 is a Falcon™ III radio manufactured and sold by Harris Corporation of Melbourne, Fla. This type of radio can support multiple wavebands form 30 MHz up to 2 GHz, including L-band SATCOM and MANET. The waveforms can provide secure IP data networking. It should also be understood that different radios can be used such as the example shown in FIG. 2 as a software defined radio, which can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification, which is hereby incorporated by reference in its entirety. The SCA is an open architecture framework that specifies how hardware and software components are to interoperate so that different manufacturers and developers can readily integrate the respective components into a single device.

Figure 3:
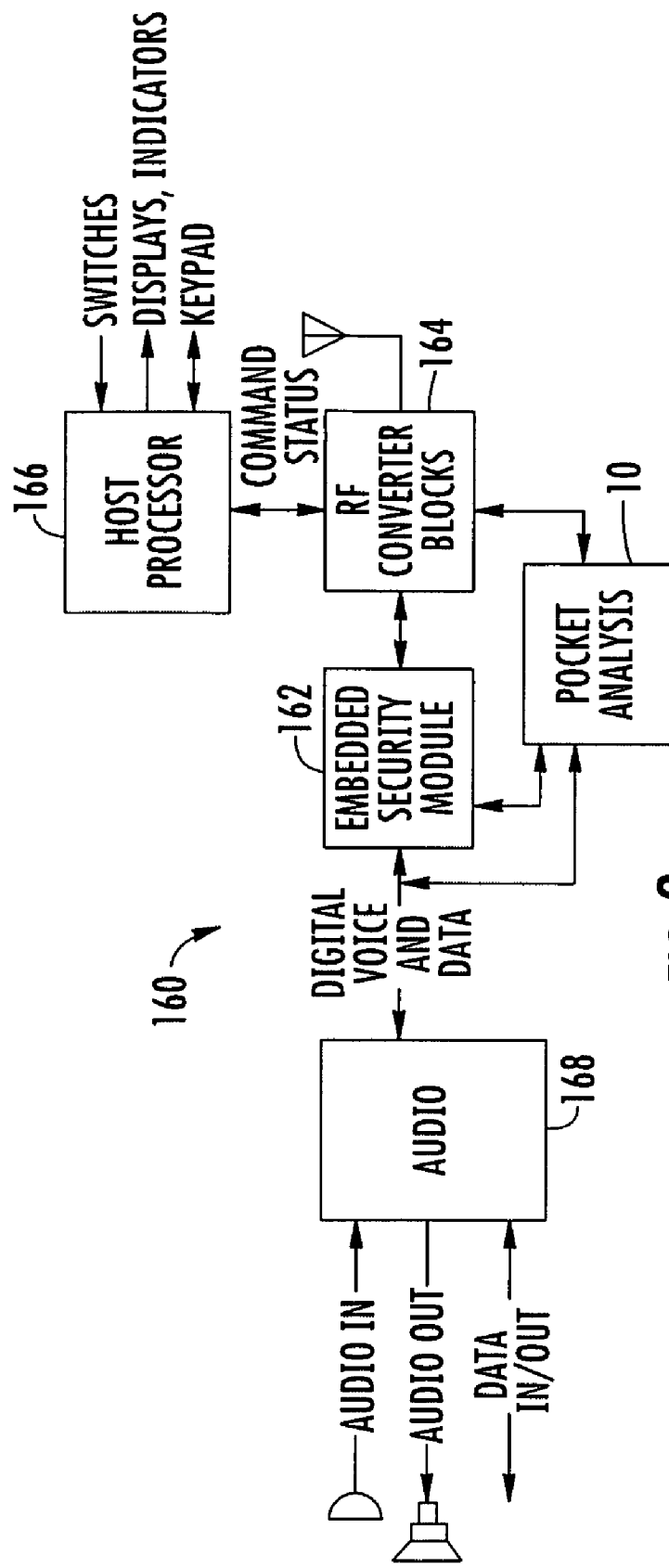
FIG. 3 is a block diagram of a communications device that includes a packet analyzer operative with the embedded security module and other components in accordance with a non-limiting example of the present invention.

FIG. 3 is an example showing how the packet analyzer 10 can be applied to a communications device, such as a radio 160 that includes an embedded security module 162 that is operative with radio frequency (RF) converter blocks 164, a host processor 166 and audio circuit 168 with digital voice and data with audio. The packet analyzer 10 could be placed parallel as illustrated or serially with the embedded security module 162.

Figure 4:
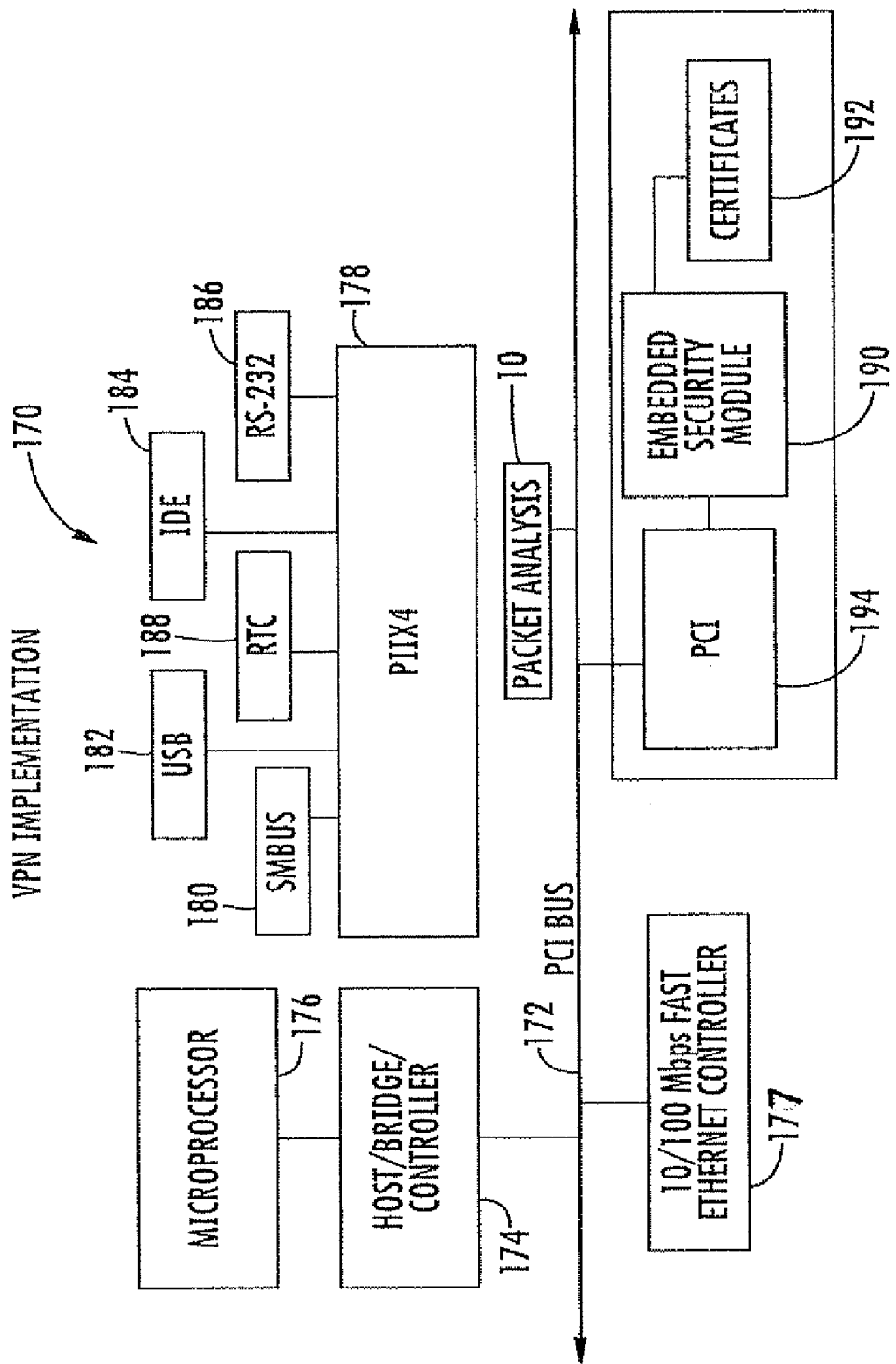
FIG. 4 is a block diagram of a virtual private network implementation and showing the packet analyzer in accordance with a non-limiting example of the present invention.

FIG. 4 shows a virtual private network 170 implementation in which the packet analyzer 10 is applied and communicates on the peripheral control interface (PCI) bus 172 that is operative with a host/bridge/controller 174 and microprocessor 176, including the 10/100 MBPS fast Ethernet controller 177. The packet analyzer 10 could analyze Ethernet frames as described above. Other components include the PIIX4 processor chip 178 that can implement the PCI bus funtionality, including the system management bus (SMBUS) 180, the universal serial bus (USB) 182, the integrated drive electronics (IDE) 184, the RS-232 interface 186 and real-time clock (RTC) 188.

The packet analyzer 10 would be operative with the embedded security module 190 that includes certificates 192 and the PCI security module 194. In an alternative arrangement, the packet analyzer 10 could be directly coupled to the embedded security module 190 for packet analysis.

Figure 5:
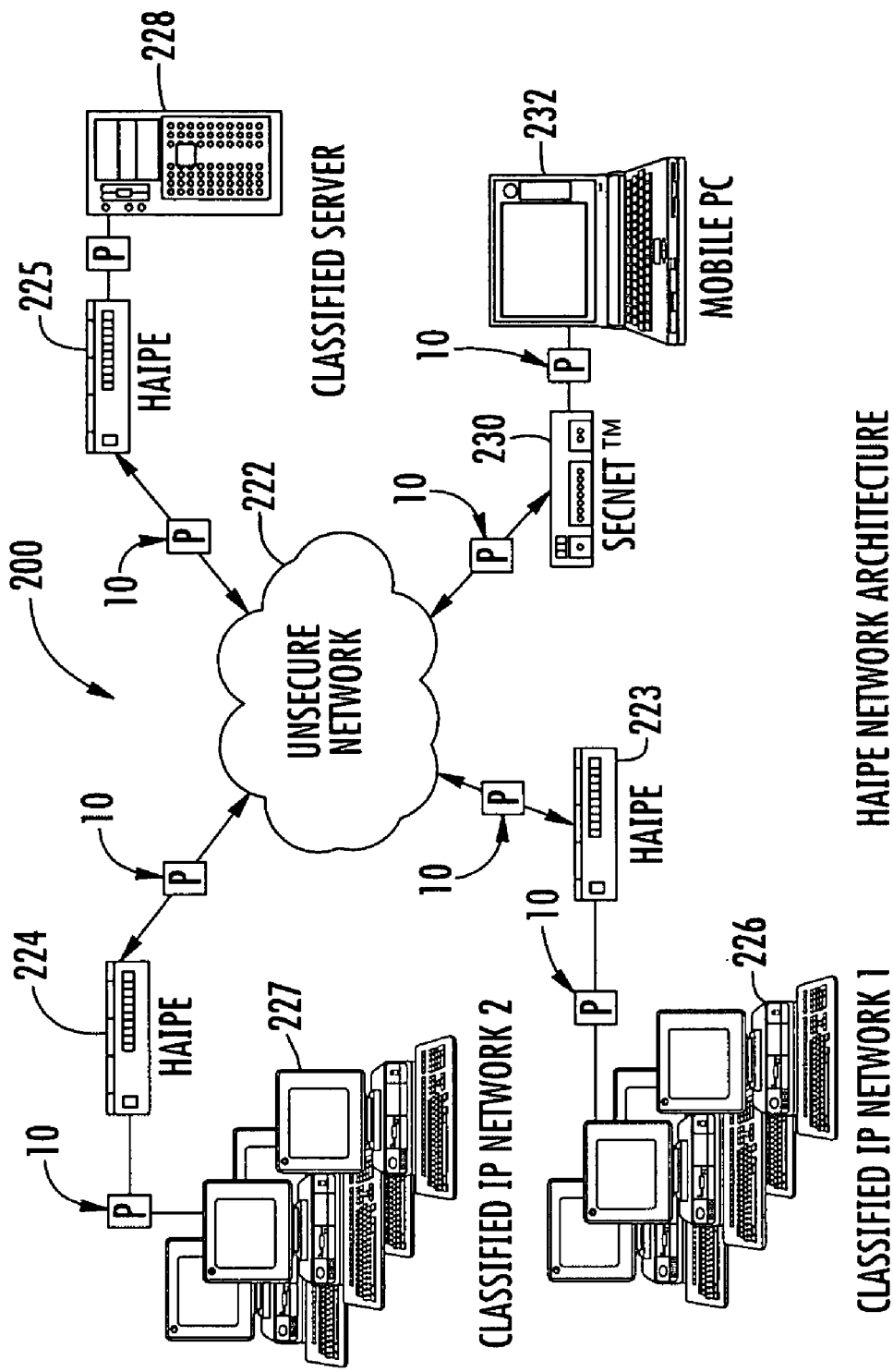
FIG. 5 is an example of an HAIPE network architecture that could incorporate the packet analyzer in different locations in accordance with a non-limiting example of the present invention.

FIG. 5 is a block diagram showing basic components of a typical High Assurance Internet Protocol Encryption (HAIPE) network architecture 200 to which the packet analyzer 10 as described could be applied to different components and interconnections depending on those areas that one skilled in the art desires for packet analysis. Different locations for the packet analyzer 10 are illustrated as non-limiting examples.

It should be understood that the HAIPIS Version 3.1 (High Assurance Internet Protocol Encryption Interoperability Specification) is the National Security Agency's latest secure internet protocol specification. HAIPIS is a powerful protocol that permits enclaves equipped with compliant gateways to communicate securely over untrusted networks.

The protocol is based on IPSec with additional restrictions and enhancements. These enhancements include multicast, over-the-network key establishment, Ethernet encapsulation, header compression, and support for Type-1 Suite A and Suite B algorithms. In addition, compliant devices support services such as networking, traffic protection, and management features that provide Information Assurance (IA) in IPv4/IPv6 networks.

FIG. 5 is an example of a current HAIPE network architecture 200 that includes an unsecured network 222 that communicates with three different HAIPE devices 223, 224, 225, which connect to a respective first classified IP network 226, and a second classified IP network 227, and a classified server 228. The unsecured network 222 also connects to a SecNet 54 device 230, which connects to a mobile personal computer 232. Different positions for the packet analyzer 10 are illustrated.

It should be understood that HAIPE is typically a type 1 encryption device that complies with the standards developed by the National Security Agency per HAIPE IS (also HAIPIS) High Assurance Internet Protocol Interoperability Specification. A HAIPE device is a secure gateway that allows two enclaves to exchange data over an untrusted network.

In one non-limiting example, the packet analyzer could be operating on bypass policy algorithm(s) which block(s), gathers statistics, and/or transforms message based on unique message content.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A packet analyzer, comprising:
   a plurality of policy engine arrays configured in parallel to each other, each having a plurality of packet analysis microengines configured in parallel to each other;
   a policy algorithm loader module operative with each packet analysis microengine for loading a policy algorithm to each packet analysis microengine such that each packet analysis microengine analyzes a specific section of a data packet in parallel within each policy engine array based on the applied policy algorithm to obtain data about the data packet for further data packet processing, wherein each packet analysis microengine analyzes individual bits or specific sections of the data packet that are different from those bits or specific sections analyzed by respective other packet analysis microengines;
   a cryptographic unit connected to said packet analysis microengines and configured to receive data from at least one packet analysis microengine and encrypt said data; and
   a bypass module connected to said packet analysis microengines and configured to bypass the header and at least one individual bit or specific section based on a policy derived from the policy algorithm around the cryptographic unit based on the data obtained by analyzing said data packets, and wherein remaining bits or specific sections of the packet that had not been bypassed are encrypted.

2. The packet analyzer according to claim 1, wherein each packet analysis microengine is operative for analyzing individual bits or packet data structures based on the policy algorithm applied to each respective packet analysis microengine.

3. The packet analyzer according to claim 1, and further comprising a policy database that stores different policy algorithms to be applied to respective packet analysis microengines.

4. The packet analyzer according to claim 1, wherein said policy algorithm loader module is operative for allocating a greater number of packet analysis microengines or policy engine arrays for analyzing data packets in response to higher data throughput requirements.

5. The packet analyzer according to claim 1, wherein each packet analysis microengine is operative for manipulating specific sections of each data packet based on the policy algorithm applied to each respective packet analysis microengine.

6. The packet analyzer according to claim 1, and further comprising a policy statistics gathering module operative with said plurality of policy engine arrays for collecting statistics concerning data packet analysis.

7. The packet analyzer according to claim 1, and further comprising a packet check module and a packet crosscheck module operative with each other and said plurality of policy engine arrays for providing redundancy for High Assurance operation.

8. The packet analyzer according to claim 1, and further comprising a communications device having first and second processing units and said cryptographic unit is configured to receive sensitive data from the first processing unit and encrypt the data to be forwarded to the second processing unit and operative with said cryptographic unit and first and second processing units.

9. The packet analyzer according to claim 8, wherein the first and second processing units comprise respective red and black side subsystems of the communications device.

10. A method of analyzing packets, comprising:
    presenting at least one data packet to a plurality of policy engine arrays that are configured in parallel to each other, each policy engine array comprising a plurality of packet analysis microengines that are configured in parallel to each other;
    analyzing a specific section of a data packet in parallel within each packet analysis microengine of a respective policy engine array based on a policy algorithm applied to each packet analysis engine to obtain data about the data packet for further data packet processing, wherein each packet analysis microengine analyzes individual bits or specific sections of the data packet that are different from those bits or specific sections analyzed by respective other packet analysis microengines;
    receiving data from the packet analysis microengines within a cryptographic unit and encrypting said data; and
    bypassing a header and at least one individual bit or specific section based on a policy derived from the policy algorithm around the cryptographic unit based on data obtained by analyzing the data packets, and wherein remaining bits or specific sections that had not been bypassed are encrypted.

11. The method according to claim 10, which further comprises analyzing individual bits or packet data structures within each packet analysis microengine based on the policy algorithm that is applied to a respective packet analysis microengine.

12. The method according to claim 10, which further comprises allocating a greater number of packet analysis microengines or policy engine arrays for analyzing data packets in response to a higher data throughput requirements.

13. The method according to claim 10, which further comprises manipulating specific sections of each data packet within a packet analysis microengine based on the policy algorithm that is applied to a respective packet analysis microengine.

14. The method according to claim 10, which further comprises manipulating specific sections of each data packet based on statistics gathered from analyzing the data packet.

15. The method according to claim 10, which further comprises scaling the number of policy engine arrays or packet analysis microengines to which the data packet is presented based on data obtained about the data packet.

16. The method according to claim 10, which further comprises reconfiguring a policy engine array for analyzing different sections of a data packet based on data obtained about the data packet.

17. The method according to claim 10, which further comprises selecting specific policy engine arrays for redundant operation for high assurance operation.

18. The method according to claim 10, which further comprises analyzing packet data to be encrypted within said cryptographic unit that receives sensitive data from a first processing unit of a communications device and encrypts the data to be forwarded to a second processing unit of the communications device.

19. The method according to claim 18, which further comprises forming the first and second processing units as respective red and black side subsystems of the communications device.

20. A communications device, comprising:
a radio circuit;
a cryptographic unit operative with the radio circuit for encrypting and decrypting communications data; and
a packet analysis module operative with the radio circuit and cryptographic unit and comprising,
a plurality of policy engine arrays configured in parallel to each other, each having a plurality of packet analysis microengines configured in parallel to each other and connected to said cryptographic unit;

a policy algorithm loader module operative with each packet analysis microengine for loading a policy algorithm to each packet analysis microengine such that each packet analysis microengine analyzes a specific section of a data packet corresponding to packetized communications data in parallel within each policy engine array based on the applied policy algorithm to obtain data about the data packet for further data packet processing, wherein each packet analysis microengine analyzes individual bits or specific sections of the data packet that are different from those bits or specific sections analyzed by respective other packet analysis microengines; and a bypass module connected to said packet analysis microengines and configured to bypass the header and at least one individual bit or specific section based on a policy derived from the policy algorithm around the cryptographic unit based on the data obtained by analyzing said data packets, and wherein remaining bits or specific sections of the packet that had not been bypassed are encrypted.

21. The communications device according to claim 20, wherein said radio circuit comprises first and second processing units, wherein said cryptographic unit receives sensitive data from the first processing unit and encrypts the data to be forwarded to the second processing unit.

22. The communications device according to claim 21, wherein the first and second processing units comprise respective red and black side subsystems of the communications device.

23. The communications device according to claim 20, wherein each packet analysis microengine is operative for analyzing individual bits or packet data structures based on the policy algorithm applied to each respective packet analysis microengine.

24. The communications device according to claim 20, wherein each packet analysis microengine is operative for manipulating specific sections of each data packet based on the policy algorithm applied to each respective packet analysis microengine.

25. The communications device according to claim 20, and further comprising a packet check module and a packet cross-check module operative with each other and said plurality of policy engine arrays for providing redundancy for High Assurance operation.

* * * * *